United States Patent

[11] 3,583,214

[72] Inventors Heinz Kreiskorte
Eberstadt;
Hans-Dieter Weber, Bickenbach, both of,
Germany
[21] Appl. No. 784,780
[22] Filed Dec. 18, 1968
[45] Patented June 8, 1971
[73] Assignee Carl Schenck Maschinenfabrik GmbH
Darmstadt, Germany

[54] APPARATUS FOR REGULATING A PREDETERMINED LOAD OPERATION
15 Claims, 13 Drawing Figs.
[52] U.S. Cl. .................................................... 73/90
[51] Int. Cl. .................................................... G01n 3/32
[50] Field of Search .......................................... 73/90, 91

[56] References Cited
UNITED STATES PATENTS
3,304,768  2/1967  Naumann et al. ............. 73/90
3,374,665  3/1968  Preston ........................ 73/90

*Primary Examiner*—Jerry W. Myracle
*Attorneys*—Curt M. Avery, Arthur E. Wilfond, Herbert L. Lerner and Daniel J. Tick

ABSTRACT: A difference amplifier is electrically connected to a load device for applying a load to an object and controls such load device. A pilot circuit applies a voltage corresponding to the pilot value of the load to one input of the difference amplifier. A reference circuit applies a voltage corresponding to a desired reference value of the load to the other input of the difference amplifier.

3,583,214
SHEET 1 OF 4
FIG.1
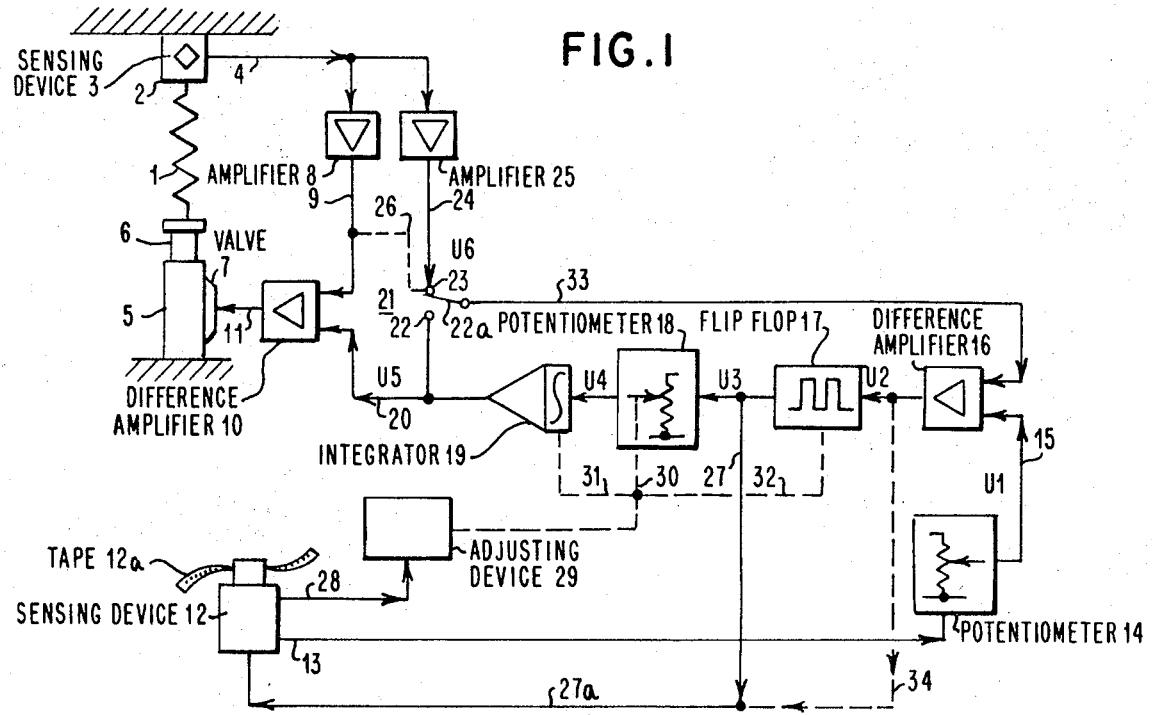
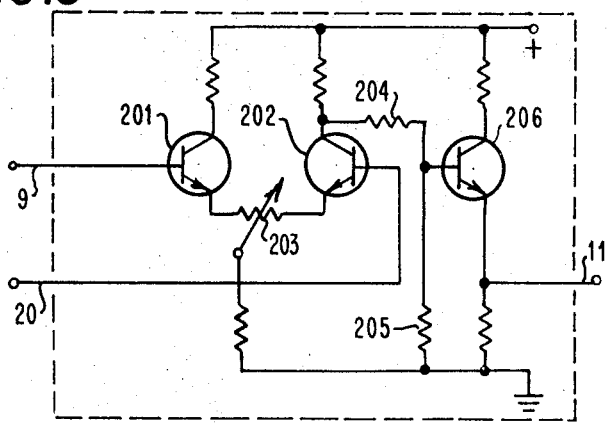
FIG.5
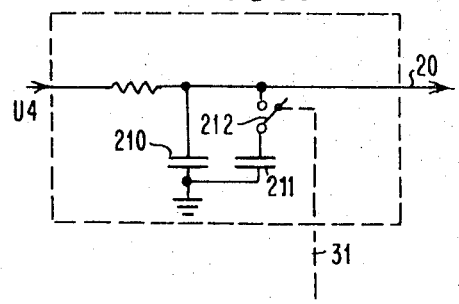
FIG.6
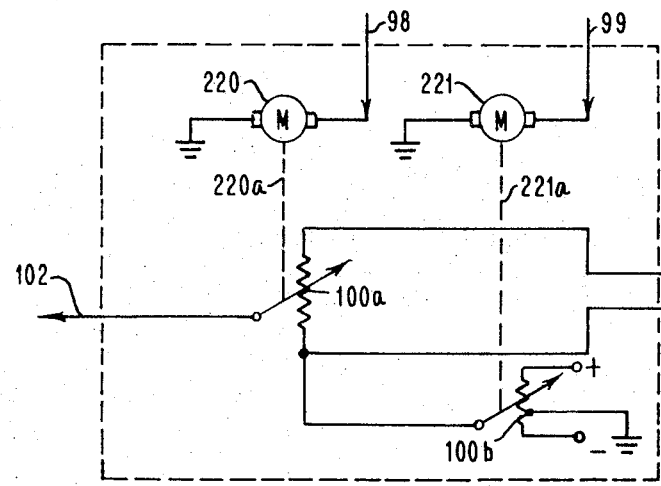
FIG.7

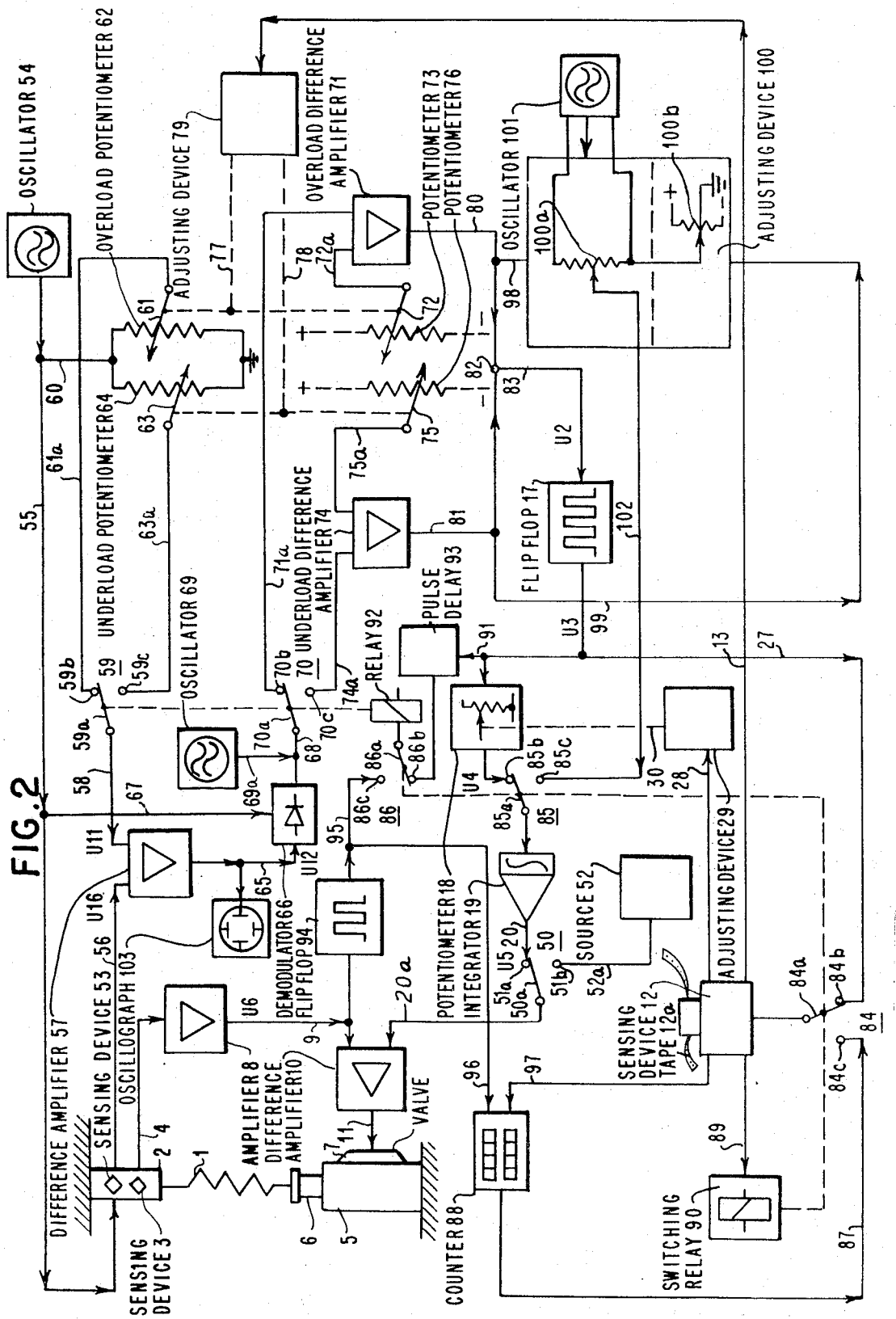

APPARATUS FOR REGULATING A PREDETERMINED LOAD OPERATION

DESCRIPTION OF THE INVENTION

The present invention relates to apparatus for regulating a predetermined load operation. More particularly, the invention relates to apparatus for regulating a predetermined load operation by providing and maintaining a predetermined increase and predetermined peak values of a load in accordance with difference between a pilot value corresponding to the load and a reference value corresponding to a desired load.

In a known hydraulically driven load or loading device, the pilot value, or actual value of the load applied to an object, is determined with the power regulation via a pressure gage which includes strain gages. The pilot value is determined for position control via an inductive position indicator and the position indication signal may be amplified prior to use. The pilot value is compared with the reference value, which reference value is the datum or desired value of the load, and the hydraulic drive is regulated in accordance with the difference between said pilot value and said reference value. The regulation of the hydraulic drive may be achieved via a difference amplifier.

The pilot value may be indicated as an electrical signal or voltage, determined by a curve which may be recorded, for example, on a magnetic track. There are numerous and considerable disadvantages in such an arrangement, since there is no certainty that the peak values of the predetermined curve are retained. Furthermore, the remaining portions of the curve are followed only when the increase in the load may be provided by the loading device. Therefore, prior to each loading process or load operation such as, for example, a load test, which is predetermined by a curve, it is necessary to determine the possibility of obtaining the values of the curve. This necessitates a considerable waste of time. It is also necessary to determine, during the load testing operation, whether the peak values will not be exceeded, since in such case the loading results would be inaccurate.

The aforedescribed disadvantages may not be eliminated by a digital representation of the peak values and the loading frequency such as, for example, by the utilization of recorded programmed data on perforated or magnetized tapes or the like. The curve may be provided between two peak values by utilization of a function generator which will produce a sinusoidal curve, for example, in addition to representing the peak values and the loading frequency digitally. It is still possible to fail to provide the peak values or the predetermined increases in the load, although the foregoing apparatus is utilized.

The peak value of the load may also be measured by the compensation method and any deviation thereof may be indicated. Compensation may be provided by adjustable potentiometers. This system, however, may only be utilized to measure the peak values, and cannot influence the loading process in any way. Thus, for example, if a load value of 4.90 Mp is provided, rather than a predetermined reference peak value of 5.80 Mp, the load applied to the object would have to be abruptly increased by 0.9 Mp in order to attain the desired value. The abrupt imposition of a load, which deviates considerably from the predetermined loading process, results in an erroneous indication, result or evaluation in the loading test. This is due to the fact that the abruptly imposed loads are not prerecorded. It is thus impossible to influence the applied load by utilizing a compensation, in accordance with the peak values and in a manner which results in the predetermined or desired values. The theoretical possibility of continuously determining the reference or desired value by utilization of a mechanically displaceable potentiometer is practically meaningless, due to the mechanical problems involved which would make the control circuit extremely complicated.

The principal object of the present invention is to provide new and improved apparatus for regulating a predetermined load operation.

An object of the present invention is to provide apparatus for regulating a predetermined load operation, which apparatus is simple in structure.

An object of the present invention is to provide apparatus for regulating a predetermined load operation, which apparatus provides continuous regulation of the loading process with efficiency, effectiveness, reliability and accuracy.

An object of the present invention is to provide apparatus for regulating a predetermined load operation, which apparatus regulates the load process in accordance with predetermined value and prevents regulation in accordance with undesired values.

An object of the present invention is to provide apparatus for regulating a predetermined load operation, which apparatus avoids the disadvantages of known apparatus.

In accordance with the present invention, a reference value circuit is provided which provides a reference voltage or signal in accordance with the value of an input signal and a time constant. This is preferably attained by utilizing an integrator having an input value and a time constant which are adjusted in accordance with recorded program data. The recorded program data may be perforated in a tape or may be magnetized in a magnetic tape. The output value of the integrator represents the reference value for the load increment. The simple control circuit insures the provision and maintenance of a predetermined or specified load increase.

A pulse or signal for additional switching of a digital readout device may be provided when the reference value and the digital peak value, as recorded in the perforated or magnetized tape, coincide with the actual or pilot value of the load. For a high degree of accuracy in indicating the peak value, the pulse may also be provided by an additional pressure indicating device which operates on the compensation principle. The pulse rate is determined by the control and regulating components of the apparatus. A pulse for continuous switching of the digital readout device is preferably provided at the output of a component which is switched in condition when it reaches a predetermined value such as, for example, a zero voltage.

If a sinusoidal load curve is to be provided at frequencies and peak values which remain constant during a predetermined number of load variations or alternations, rather than a linear increase in load, the reference or datum value, which varies sinusoidally, is provided by applying a sinusoidal voltage to the integrator. The sinusoidal voltage applied to the integrator may be produced by an oscillator and applied to said integrator via a potentiometer having a voltage at its end terminals which is varied toward zero in accordance with the average load and having a movable contact or tap which is varied in position in accordance with the magnitude of the load. The average load and the magnitude of the load are determined by an evaluator which is supplied with a signal indicating a difference between the pilot value and the predetermined or reference peak values which are digitally recorded, and said signal is utilized to adjust the potentiometer. The continuous switching of the readout device is provided via a countercircuit which may be adjusted to the desired number of load variations or alternations.

In accordance with the present invention, apparatus for regulating a predetermined load operation by providing and maintaining a predetermined increase and predetermined peak values of a load in accordance with a difference between a pilot value corresponding to the load and a reference value corresponding to a desired load includes load means for applying a load to an object. A difference amplifier having two inputs and an output is electrically connected to the load means for controlling the load means. Pilot means applies a voltage corresponding to the pilot value to one input of the difference amplifier. Reference means applies a voltage corresponding to the reference value to the other input of the difference amplifier. The reference means comprises means for varying the reference value in accordance with a time constant.

The reference means comprises record means for recording program data including a desired reference value and sensing means for reading out the data. Compensating means having input and output means may be coupled to the sensing means for comparing the pilot value with the reference value and for continued switching of the sensing device when the pilot and reference values coincide.

The reference means comprises comparing means having inputs coupled to the pilot means and to the sensing means and an output coupled to the sensing means for continued switching of the sensing means when the reference value and the pilot value coincide. The comparing means of the reference means comprises difference amplifier means. The comparing means may comprise a single difference amplifier. The reference means further comprises switching means connected between the output of the difference amplifier and the sensing means for switching in condition when the voltage applied thereto reaches zero. The comparing means may comprise a pair of difference amplifiers and a pair of potentiometers each connected in an input of a corresponding one of the difference amplifiers. The difference amplifiers provide a pulse for continued switching of the sensing means. The pulse has a repetition rate determined by the potentiometers in accordance with the pilot value and an adjusted reference value.

The program data also includes a digital peak value and the comprising means of the reference means continues switching of the sensing means when the pilot value and the peak value coincide. The program data also includes time constant data. The switching means is coupled between the output of the comparing means and the integrator for switching in condition when the voltage applied thereto reaches zero and for varying the input voltage of the integrator in accordance with the value of the time constant. A potentiometer is connected between the switching means and the integrator and varies the voltage applied to the integrator.

The apparatus may provide sinusoidal loads having frequencies and peak values which remain constant during a specific number of load alternations. The reference means includes an integrator having a variable time constant and an input. A potentiometer having a displaceable intermediate contact and a displaceable end terminal is provided. An oscillator is coupled to the input of the integrator via the potentiometer for applying a sinusoidal voltage to the integrator. Means coupled to the end terminal of the potentiometer displaces the end terminal toward zero in accordance with the average load. Means coupled to the intermediate contact of the potentiometer displaces the contact in accordance with the amplitude of the load. The program data also includes time constant data and the sensing means varies the time constant of the integrator in accordance with the data. The reference means further comprises a potentiometer connected in the input of the integrator. The sensing means is coupled to the potentiometer and varies the potentiometer in accordance with the data.

The reference means further comprises evaluating means coupled to the end terminal of the potentiometer and coupled to the intermediate contact of the potentiometer for determining the magnitude of the average load and for determining the amplitude of the load and for displacing the end terminal and intermediate contact in accordance with its determinations. A signal indicating the deviation of the pilot value of the peak load from the recorded reference value therefor is supplied to the evaluating means.

In order that the present invention may be readily carried into effect, it will now be described with reference to the accompanying drawings, wherein:

FIG. 1 is a block diagram of an embodiment of the apparatus of the present invention for regulating a predetermined load operation;

FIG. 2 is a block diagram of another embodiment of the apparatus of the present invention for regulating a predetermined load operation;

FIG. 5 is a circuit diagram of an embodiment of a difference amplifier which may be utilized in the apparatus of the present invention;

FIG. 6 is a circuit diagram of an embodiment of an integrator which may be utilized in the apparatus of the present invention; and FIG. 7 is a circuit diagram of an embodiment of an adjusting device which may be utilized in the apparatus of the present invention; and FIG. 7 is a circuit diagram of an embodiment of an adjusting device which may be utilized in the apparatus of the present invention.

In the FIGS., the same components are provided with the same reference numerals. Power-regulated testing machines were utilized for the illustrated devices and the control devices of the present invention function in a manner which is also suitable for position-regulated testing machines.

Figure 3A:
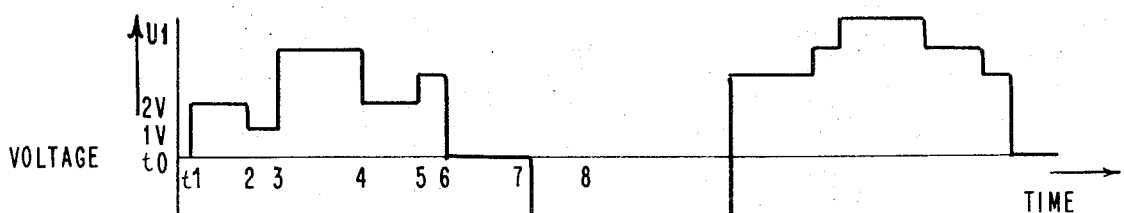
FIGS. 3a, 3b, 3c, 3d and 3e are graphical presentations of the voltages appearing in the apparatus of FIGS. 1 and 2 during the production of specific loads.

In FIG. 1, an object 1, which is to be loaded, is clamped between a clamp or holder 2 and a piston 6 of a cylinder 5. The holder 2 includes a pickup or sensing device for determining the magnitude of the load applied to the object 1.

The sensing device 3 is electrically connected to an amplifier 8 via a lead 4. The amplifier 8 amplifies the signal produced by the sensing device 3, so that the output of said amplifier is proportional to the load or force applied to the object 1. The output of the amplifier 8 thus constitutes the pilot value or actual value of the applied load. The pilot value produced by the amplifier 8 is applied to one input of a difference amplifier 10 via a lead 9.

A reference or datum value or voltage U5 is applied to the other input of the difference amplifier 10 via a lead 20. The difference amplifier 10 provides a voltage in accordance with the difference between the applied pilot value and reference value and amplifies such difference voltage. The amplified difference voltage is applied to a servovalve or other suitable valve 7 via a lead 11. The servo valve 7 controls the position of the piston 6 in the cylinder 5 in accordance with the magnitude of the voltage applied to said valve. If the servo valve 7 is replaced by a simple valve, said valve must be made to control the operation of a pump for fluid in the cylinder 5 or the operation of a fluid feed control device in accordance with the magnitude of the voltage supplied via the lead 11.

The reference values for the peak loads are recorded as digits in a suitable record medium such as, for example, a perforated or magnetized tape 12a, and are sensed or read out by a suitable sensing device 12. The reference values for the peak loads are applied to a potentiometer 14 via a lead 13 from the sensing device 12 coupled in any suitable known manner, mechanically or electrically. The potentiometer 14 may be replaced by two potentiometers, one of which is utilized for the maximum load and the other of which is utilized for the minimum load. The potentiometer 14 provides a voltage U1 which is applied to one input of a difference amplifier 16 via a lead 15.

The difference amplifier 16 has another input which is connected to a fixed terminal of the switch arm 22a of a switch 21 via a lead 33. The switch arm 22a is movable between a contact 22 and a contact 23. The contact 23 of the switch 21 is connected to the output of an amplifier 25 via a lead 24. The input of the amplifier 25 is connected to the output of the sensing device 3 via the lead 4. The contact 22 of the switch 21 is connected to the lead 20 which connects the output of an integrator 19 to the corresponding input of the difference amplifier 10.

The switch 21 and the lead 33 function to apply either a voltage U5, produced by the integrator 19, or a voltage U6, produced by the amplifier 25, to the corresponding input of the difference amplifier 16. When the switch arm 22a of the switch 21 makes electrical contact with the contact 22, the output voltage U5 of the integrator 19 is applied to the difference amplifier 16. When the switch arm 22a of the switch 21 is in electrical contact with the contact 23, the output voltage U6 of the amplifier 25 is applied to the difference amplifier 16.

The difference amplifier 16 produces an output voltage which is the difference between the voltages applied to its two inputs. The difference amplifier 16 amplifies its difference voltage and produces an amplified difference voltage U2 at its output. The output voltage U2 of the difference amplifier 16 is applied to the input of a flip-flop 17. The flip-flop 17 may comprise, for example, a Schmitt trigger circuit, and produces an output voltage U3 which is applied to the input of a potentiometer 18. The output voltage U4 of the potentiometer 18 is applied to the input of the integrator 19.

The sensing device 12 is continuously operated by the voltage pulse U3 provided by the flip-flop 17. The pulse of the flip-flop 17 is applied to the sensing device 12 via a lead 27 and a lead 27a. The sensing device 12 may also be operated by the output voltage U2 of the difference amplifier 16. The output voltage of the difference amplifier 16, if so utilized, is applied to the sensing device 12 via a lead 34, shown in broken lines, and the lead 27a. The flip-flop voltage U3 is preferred, however, for controlling the operation of the sensing device 12, since said voltage defines the switching point of said sensing device more accurately.

The time constant of the integrator 19 is adjustable by adjustment of the potentiometer 18. The sensed information for the time constant is supplied to an adjusting device 29 via a lead 28. The simplest way to adjust the time constant of the integrator 19 is by adjustment of the voltage U4 produced by the adjusting potentiometer 18. The adjusting device 29 may be mechanically or electrically coupled to the integrator 19 via a link or lead 31, to the potentiometer 18 via a link or lead 30, or to the flip-flop 17 via a line or lead 32, in order to adjust the time constant. The links or leads 30, 31 and 32 are indicated by the broken lines.

The amplifier 25 may be eliminated in most cases. If the amplifier 25 is eliminated, the output of the amplifier 8 is electrically connected to the contact 23 of the switch 21 via the lead 9 and a lead 26. The lead 26 is indicated by broken lines.

In the embodiment of FIG. 2, the peak load values are measured and controlled by a compensator. The circuit of FIG. 2 permits a sinusoidal loading process with frequencies and peak values which remain constant during a determined number of load variations, fluctuations or alternations. In FIG. 2, the clamp or holder 2, the sensing device 3, the cylinder 5, the piston 6, the valve 7, the amplifier 8 and the difference amplifier 10 are the same as in the embodiment of FIG. 1 and function in the same manner.

The reference or datum value or voltage U5 is applied to the corresponding input of the difference amplifier 10 via the lead 20, a switch 50 and a lead 20a. The switch 50 comprises a switch arm 50a permanently connected at one end to the lead 20a and movable at its other end between a contact 51a and a contact 51b. The contact 51a is connected to a source 52 via a lead 52a. The source 52 provides an extreme reference value.

Thus, when the switch arm 50a of the switch 50 is in electrical contact with the contact 51a, the output voltage U5 of the integrator 19 is applied to the corresponding input of the difference amplifier 10 as the reference value. When the switch arm 50a of the switch 50 is in electrical contact with the contact 51b, an extreme reference value provided by the source 52 is applied to the corresponding input of the difference amplifier 10.

The embodiment of FIG. 2 differs from that of FIG. 1 by including a second sensing device or pickup 53 in the holder or clamp 2. The second sensing device 53 is energized by an oscillator 54 via a lead 55. The sensing device 53 produces an output voltage U16 which is applied to one input of a difference amplifier 57 via a lead 56. The other input of the difference amplifier 57 is permanently connected to one end of a switch arm 59a of a switch 59 via a lead 58. The switch 59 includes a contact 59b and a contact 59c. The switch arm 59a is movable between the contacts 59b and 59c of the switch 59.

The contact 59b of the switch 59 is connected to the movable contact or tap 61 of a potentiometer 62 via a lead 61a. The contact 59c of the switch 59 is connected to the movable contact or tap 63 of a potentiometer 64 via a lead 63a. The potentiometer 62 is an overload potentiometer and the potentiometer 64 is and underload potentiometer. When the switch arm 59a of the switch 59 is in electrical contact with the contact 59b, the potentiometer 62 applies a voltage to the corresponding input of the difference amplifier 57. When the switch arm 59a of the switch 59 is in electrical contact with the contact 59c, the potentiometer 64 applies a voltage to the corresponding input of the difference amplifier 57. A voltage is supplied to each of the potentiometers 62 and 64 by the oscillator 54 via a lead 60. The other ends of the potentiometer 62 and 64 are connected to a point at ground potential.

The output voltage U12 produced by the difference amplifier 57, in accordance with the difference between the voltages U16 and U11 applied to said difference amplifier, is applied to the input of a demodulator 66 via a lead 65. The oscillator 54 supplies a signal to the demodulator 66 via the lead 55 and a lead 67. The output of the demodulator 66 is permanently connected to one terminal of the switch arm 70a of a switch 70 via a lead 68. The switch arm 70a of the switch 70 is movable between a contact 70b and a contact 70c of said switch. The contact 70b is connected to one input of an overload difference amplifier 71 via a lead 71a. The contact 70c is connected to one input of an underload difference amplifier 74 via a lead 74a.

Thus, when the switch arm 70a is in electrical contact with the contact 70b, the output of the demodulator 66 is applied to the corresponding input of the overload difference amplifier 71. When the switch arm 70a of the switch 70 is in electrical contact with the contact 70c, the output of the demodulator 66 is applied to the corresponding input of the underload difference amplifier 74. An oscillator 69 is connected to the lead 68 via a lead 69a, so that the voltage produced by said oscillator and the output voltage of the demodulator 66 are combined with each other to produce a resultant voltage which is applied to the overload difference amplifier 71 or the underload difference amplifier 74 via the switch 70.

The movable contact or tap 72 of a potentiometer 73 is connected to the other input of the overload difference amplifier 71 via a lead 72a. The movable contact or tap 75 of a potentiometer 76 is connected to the other input of the underload difference amplifier 74 via a lead 75a. The necessary tolerance for the reversal of the electromechanical control system, to maintain its effectiveness with regard to the object 1, is provided by adjustment of the potentiometers 73 and 76. The potentiometers 62 and 73 are adjusted via a mechanical coupling 77 which mechanically couples the movable contacts 61 and 72 to an adjusting device 79. The adjusting device 79 of FIG. 2, as the adjusting device 29 of FIG. 1, is energized by control pulses applied thereto via the lead 13 from the sensing device 12. The control pulses provided by the sensing device 12 correspond to the adjusted values.

The output voltage of the overload difference amplifier 71 and the output voltage of the underload difference amplifier 74 are applied to a circuit point 82 via leads 80 and 81, respectively, and are combined with each other at said circuit point. The combined output voltage U2 of the overload and underload difference amplifiers 71 and 74 are applied from the circuit point 82 to the input of the flip-flop 17 via a lead 83. The output voltage pulse U3 of the flip flop 17 is applied to the sensing device 12 via the lead 27 and a switch 84. The switch 84 comprises a switch arm 84a which is permanently connected at one terminal to the sensing device 12. The other terminal of the switch arm 84a is movable between a contact 84b and a contact 84c. The contact 84b is connected to the lead 27 and the contact 84c is connected to a lead 87.

The switch 84 thus applies the output voltage U3 of the flip-flop 17 to the sensing device 12 when its switch arm 84a is in electrical contact with the contact 84b. The switch 84 applies the output of a counter 88 to the sensing device 12 via the lead 87, when the switch arm 84a thereof is in electrical contact with the contact 84c.

A switch 85 comprises a switch arm 85a permanently connected at one end terminal to the input of the integrator 19 and movable at the other end terminal between a contact 85b and a contact 85c. The contact 85b is connected to the output of the potentiometer 18 and the contact 85c is connected to an adjusting device 100 via a lead 102. Thus, when the switch arm 85a is in electrical contact with the contact 85b, the output voltage U4 of the potentiometer 18 is applied to the integrator 19. When the switch arm 85a of the switch 85 is in electrical contact with the contact 85c, the output of the adjusting device 100 is applied to the integrator 19.

A pulse delay 93 is connected (via a lead 91) to a common point at the junction of the lead 27 and a lead from the output of the flip-flop 17 to the input of the potentiometer 18. A switch 86 comprises a switch arm 86a permanently connected at one end terminal to a switchover relay 92 and movable at the other end terminal between a contact 86b and a contact 86c. The contact 86b of the switch 86 is connected to the output of the pulse delay 93. The contact 86c of the switch 86 is connected to the output of a flip-flop 94 via a lead 95. Thus, when the switch arm 86a is in electrical contact with the contact 86b, the output of the pulse relay 93 is applied to and energizes the switchover relay 92. When the switch arm 86a of the switch 86 is in electrical contact with the contact 86c, the output of the flip-flop 94 is applied to and energizes the relay 92.

The sensing device 12 is connected to a switching relay 90 via a lead 89. The switching relay 90 controls the operation of the switch arms 84a, 85a and 86a of the switches 84, 85 and 86, respectively. The sensing device 12 controls the condition of the switches 84, 85 and 86 via the switching relay 90 when it is desired to switch from a linear load increment to a sinusoidal load curve at frequencies and peak values which remain constant during a determined period of load variations. The switchover from linear to sinusoidal operation is in accordance with information recorded in the tape 12a and read out by the sensing device 12.

The output voltage U3 of the flip-flop 17 is applied to the pulse delay 93 via the lead 91, and from said pulse delay to the switchover relay 92 via the switch 86, when said switch is in its position shown in FIG. 2. The switchover relay 92 controls the switch arms 70a and 59a of the switches 70 and 59, respectively. The switchover relay 92 thus positions the switch arm 59a of the switch 59 to connect either the movable contact 62 of the overload potentiometer 62 or the movable contact 63 of the underload potentiometer 64 to the corresponding input of the difference amplifier 57. The switchover relay 92 positions the switch arm 70a of the switch 70 to apply the output voltage of the demodulator 66 to the corresponding input of either the overload difference amplifier 71 or the underload difference amplifier 74.

The pulse delay 93 delays the output voltage pulse of the flip-flop 17 sufficiently for exact regulation. When the switch arm 86a is in its position opposite that shown in FIG. 2, it applies the output voltage of the flip-flop 94 to the switchover relay 92, as hereinbefore described, and thereby energizes said relay. The switchover relay 92 is energized at a constant frequency and in accordance with the zero point of the output voltage U6 of the amplifier 8. The output voltage of the flip-flop 94 is also applied to one input of the counter 88 via a lead 96. The counter 88 functions to count the number of load alternations or variations. The sensing device 12 is connected to the other input of the counter 88 via a lead 97 and thereby provides the reference value of the desired number of load alternations or variations to said counter.

The output voltage of the overload difference amplifier 71 is applied to the adjusting device 100 via a lead 98, and the output voltage of the underload difference amplifier 74 is applied to said adjusting device via a lead 99. The adjusting device 100 includes an adjusting potentiometer 100a and an adjusting potentiometer 100b. The output voltage over the overload difference amplifier 71 affects the potentiometer 100a in accordance with the amplitude and the output voltage of the underload difference amplifier 74 affects the potentiometer 100b in accordance with the average load. The adjusting device 100b produces correcting pulses for the average load for short periods, due to the integrator 19, which is connected to the output of the adjusting device 100 via the lead 102, as hereinbefore described. An oscillator 101 produces a sinusoidal voltage having a variable frequency. The output voltage of the oscillator 101 is applied to the amplitude adjusting device 100a. An oscillograph 103 is connected to the lead 65 at a common point between the output of the difference amplifier 57 and the input of the demodulator 66. The oscillograph 103 functions to indicate the compensation measuring signal and to select the mode of operation of the regulating apparatus.

Figure 3B:
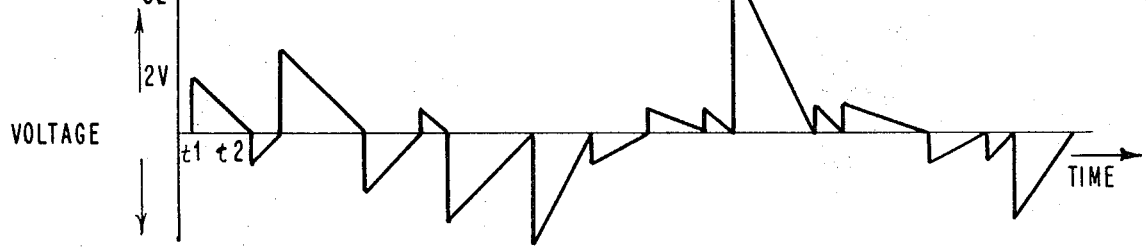
Figure 3C:
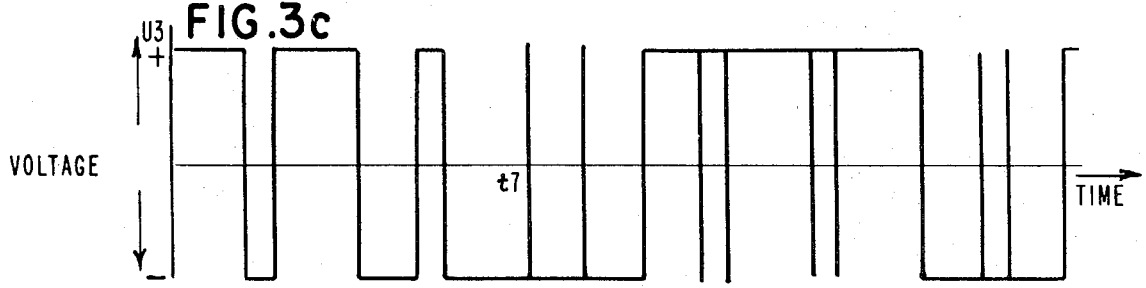

The operation of the regulating apparatus of FIG. 1 is illustrated in FIGS. 3a, 3b, 3c, 3d and 3e. The sensing device 12 adjusts the potentiometer 14 in accordance with information recorded in the tape 12a, so that said potentiometer produces the output voltage U1. The output voltage U1 of the potentiometer 14 is shown in FIG. 3a. The voltage U1 has a magnitude of zero at the time instant $t0$, as does each voltage U2, U4 and U6, shown in FIGS. 3b, 3d and 3e, respectively. At the time instant $t0$, the voltage U3 has a positive magnitude, rather than zero, as shown in FIG. 3c.

Figure 3D:
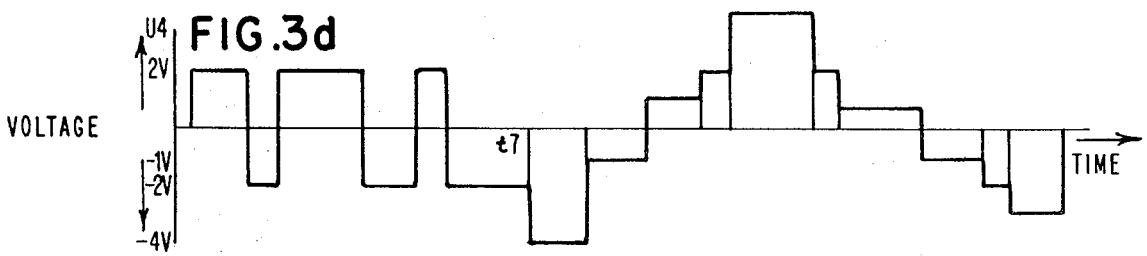
Figure 3E:
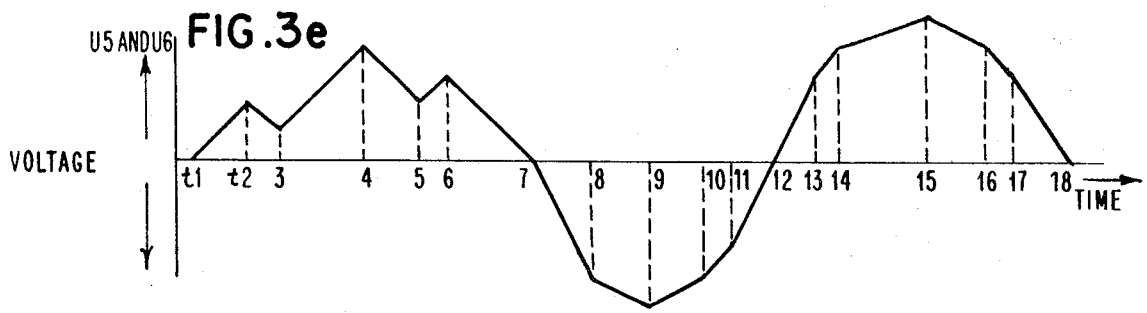

In each of FIGS. 3a, 3b, 3c, 3d and 3e, the abscissa represents the time $t$ and the ordinate represents the voltage. In FIG. 3a, the voltage is U1. In FIG. 3b, the voltage is U2. In FIG. 3c, the voltage is U3. In FIG. 3d, the voltage is U4. In FIG. 3e, the voltage is U5 and U6.

If the voltage U1 of FIG. 3a has a magnitude of 2 volts at the time instant $t1$ and is applied to the corresponding input of the difference amplifier 16 via the potentiometer 14, and if the input voltage U4 of the integrator 19 (FIG. 3d) is simultaneously adjusted to 2 volts by adjustment of the potentiometer 18 to determine the time constant of said integrator, the output voltage U2 of said difference amplifier will also have a magnitude of 2 volts (FIG. 3b), since the output voltage U6 (FIG. 3e) of the amplifier 25 has a magnitude of zero at the time instant $t1$. The operation of the integrator 19 to integrate the voltage U4, produced by the potentiometer 18 and applied to the input of said integrator, results in a linear increase of the voltage U6 in correspondence with the increase in the load.

The voltage U2 (FIG. 3b) decreases linearly from its magnitude of 2 volts at the time instant t1 and has a magnitude of zero at the time instant $t2$. The decrease of the voltage U2 to zero at the time instant $t2$ switches over the flip-flop 17 so that the output voltage U3 (FIG. 3c) of the said flip-flop is reversed in polarity and a voltage pulse is applied to the sensing device 12 from said flip-flop for stepping up said sensing device. The voltage U1 is adjusted to 1 volt at the time $t2$ by means of the adjusting potentiometer 14, whereas the adjusting potentiometer 18 remains unchanged, so that the input voltage U4 (FIG. 3d) of the integrator 19 then decreases to −2 volts at the time $t2$. Analogously, an additional recorded value in the tape 12a is assumed to be the peak value when the voltage U2 (FIG. 3b) decreases to a magnitude of zero and the voltage U3 (FIG. 3c) becomes negative, at the time $t2$.

The adjustment of the potentiometer 18 is not changed until the time $t7$, so that the time constant of the integrator 19 is also unchanged until the time $t7$. At the time $t7$, a voltage of −4 volts is adjusted to be the peak value, and the potentiometer 18 is adjusted to vary the output voltage U4 (FIG. 3d) to −4 volts. The output voltage U3 of the flip-flop 17 (FIG. 3c) is then negative. The negative increase of the input voltage U4 of the integrator 19 (FIG. 3d) produces a corresponding negative increase in the voltage U5 and U6 (FIG. 3e) until the determined value is reached at the time $t8$. The peak value is determined to be more negative by 1 volt at the time $t9$, and the input voltage U4 of the integrator 19 (FIG. 3d) increases to a positive magnitude at a considerably diminished rate at such time. The time constant is also varied in a similar manner until the time $t12$, upon the determination of a new peak value.

In the period from the time t12 to t19, a sinusoidal curve may be provided by determining or assuming suitable peak values and integrator time constant. This results in a zero magnitude of the voltage U4 applied to the input of the integrator 19 during the period from the time t15 to the time t16 (FIG. 3d). The adjusted load value thus remains constant during the period t15 to t16.

Figure 4A:
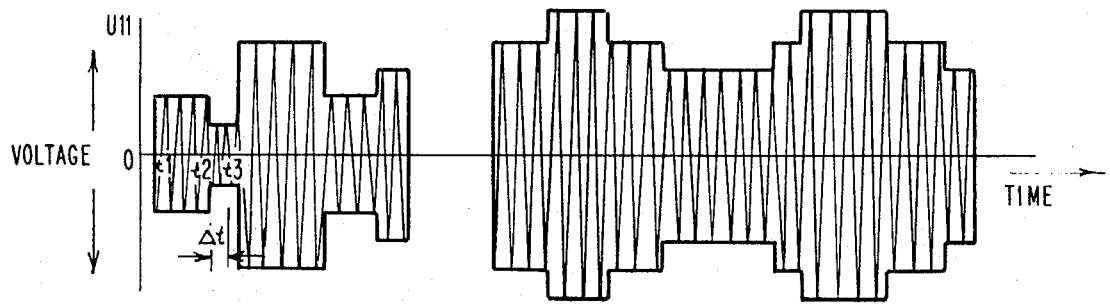
FIGS. 4a, 4b and 4c are graphical presentations of the voltages appearing at difference points in the apparatus of FIG. 2.
Figure 4B:
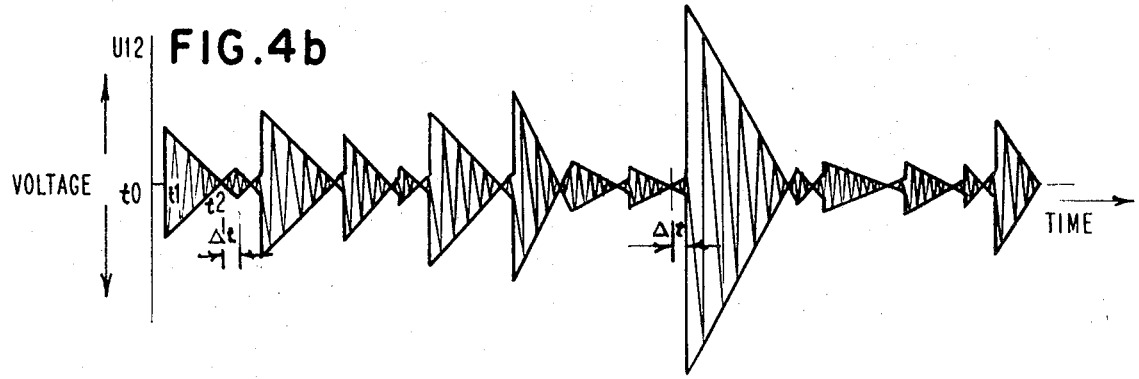
Figure 4C:
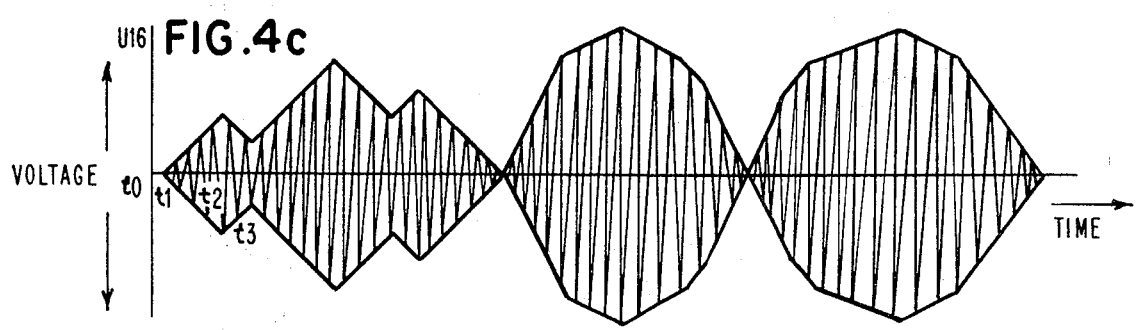

FIGS. 4a, 4b and 4c, in conjunction with FIGS. 3b, 3c, 3d and 3e, illustrate the operation of the compensator of FIG. 2. In each of FIGS. 4a, 4b and 4c, the abscissa represents the time and the ordinate represents the voltage. FIG. 4a illustrates the voltage U11 applied to one of the inputs of the difference amplifier 57 of FIG. 2. FIG. 4b illustrates the output voltage U12 of the difference amplifier 57 of FIG. 2. FIG. 4c illustrates the voltage applied to the other input of the difference amplifier 57 of FIG. 2. The voltages U2, U3, U4, U5 and U6 of FIG. 2 are the same as those of FIG. 1. A carrier voltage, modulated in accordance with the actual or pilot load applied to the object 1 by the sensing device 53, is provided as an input voltage U16 to the difference amplifier 57 (FIG. 4c). A carrier voltage, modulated by the overload potentiometer 62 or the underload potentiometer 64, is applied as an input voltage U11 to the difference amplifier 57 (FIG. 4a). The output voltage U12 (FIG. 4b) of the difference amplifier 57 is thus the difference between the modulated carrier voltages U11 and U16. If the voltage U11 and the voltage U16 have the same magnitude, the difference voltage U12 has a magnitude of zero and therefore the input voltage U12 of the flip-flop 17 (FIG. 2) has a magnitude of zero. The subsequent operation of FIG. 2 corresponds to the aforedescribed operation of FIG. 1.

The adjusting device 100 has been described as relating to sinusoidal loads. When the switch arm 85a of the switch 85 is in electrical contact with the contact 85c of said switch or when said switch arm is in electrical contact with the contact 85b, the voltage difference between the adjusting device 100 and the potentiometer 18 is insufficient to produce an abrupt reaction in the hydraulic loading device 5, 6, 7, since the output voltage U5 of the integrator 19 may increase only in accordance with the adjusted time constant.

As shown in FIGS. 4a and 4b, the pulse transmitted for switching over the compensating potentiometers is delayed by a period of time Δt. The delay period Δt is adjusted by the pulse delay 93. The time delay is necessary if an exact determination of the peak value is to be made.

Each of the components of each of FIGS. 1 and 2 comprises any suitable component known in the art for performing the function ascribed to it.

Each of the difference amplifiers 10 and 16 and each of the difference amplifiers utilized in the apparatus of the present invention may comprise any suitable amplifier such as, for example, that shown in FIG. 5. In the difference amplifier 10, for example, the input voltages are applied via the leads 9 and 20 and the output voltages are derived via the lead 11. The input voltages are amplified by a pair of transistors 201 and 202; the voltage in the lead 9 being applied to the base electrode of the transistor 201 and the voltage in the lead 20 being applied to the base electrode of the transistor 202.

A variable resistor 203 is connected between the emitter electrodes of the transistors 201 and 202. The movable contact of the variable resistor 203 is connected to ground. The collector electrode of the transistor 202 is connected to the base electrode of a third transistor 206 via a resistor 204 of a voltage divider 204, 205. A voltage proportional to the difference between the input voltages occurs at the voltage divider 204 and 205 and is amplified by the transistor 206.

The difference voltage provided at the resistors 204 and 205, after amplification, is provided as the output voltage in the lead 11 connected to the emitter electrode of said transistor.

The integrator 19 utilized in the apparatus of the present invention may comprise any suitable integrator such as, for example, that shown in FIG. 6.

The integrator circuit of FIG. 6 includes a capacitor 210 which functions to integrate the voltage U4 which is variable with time. The integration constant may be varied by connecting a capacitor 211 in parallel with the capacitor 210 via a switch 212. The switch 212 is operated via the link 31.

The adjusting device 100 utilized in the apparatus of the present invention may comprise any suitable adjusting device, such as, for example, that shown in FIG. 7. In the adjusting device of FIG. 7, a motor 220 is controlled via the lead 98 and controls the potentiometer 100a via a link 220a. A motor 221 is controlled via the lead 99 and controls the potentiometer 100b via a link 221a. The motors 220 and 221, and therefore the potentiometers 100a and 100b, are thus controlled in accordance with the outputs of the underload difference amplifier 74 and the output of the overload difference amplifier 71.

The potentiometer 18 of the apparatus of the present invention may comprise the potentiometer shown in FIG. 6 of U.S. Pat. No. 3,187,565.

The adjusting device 29 and the adjusting device 79 of the apparatus of the present invention may comprise the adjusting device shown in FIG. 7 of U.S. Pat. No. 3,187,565. The demodulator 66 of the apparatus of the present invention may comprise any suitable demodulator, such as, for example, the component 96 shown in FIG. 5 of U.S. Pat. No. 3,187,565. The source 52 of the apparatus of the present invention may comprise any suitable reference source, such as, for example, a tape recorder which is utilized to predetermine a voltage in proportion to the load curve.

While the invention has been described by means of specific examples and in specific embodiments, we do not wish to be limited thereto, for obvious modifications will occur to those skilled in the art without departing from the spirit and scope of the invention.

We Claim:

1. Apparatus for regulating a predetermined load operation by providing and maintaining a predetermined increase and predetermined peak values of a load in accordance with a difference between a pilot value corresponding to the load and a reference value corresponding to a desired load, said apparatus comprising sinusoidal loads having frequencies and peak values which remain constant during a specific number of load alternations for applying a load to an object;

difference amplifier means having two inputs and an output electrically connected to said loads for controlling said loads;

pilot means for applying a voltage corresponding to said pilot value to one input of said difference amplifier means; and reference means for applying a voltage corresponding to said reference value to the other input of said difference amplifier means, said reference means comprising means for varying said reference value in accordance with a time constant, said reference means including integrator means having a variable time constant and an input, potentiometer means having an end terminal, a displaceable intermediate contact and a displaceable end terminal, an oscillator coupled to the input of said integrator means via an end terminal and the intermediate contact of said potentiometer means for applying a sinusoidal voltage to said integrator means, means coupled to the end terminal of said potentiometer means for displacing said end terminal toward zero in accordance with the average load and means coupled to the intermediate contact of said potentiometer means for displacing said contact in accordance with the amplitude of the load.

2. Apparatus as claimed in claim 1, wherein said reference means further comprises first evaluating means coupled to the displaceable end terminal and said potentiometer means for determining the magnitude of the average load and for displacing said end terminal and second evaluating means coupled to the intermediate contact of said potentiometer means for determining the amplitude of the load and for displacing said intermediate contact in accordance with its determinations.

3. Apparatus as claimed in claim 1, wherein said reference means further comprises first evaluating means coupled to the displaceable end terminal of said potentiometer means for determining the magnitude of the average load and for displacing said end terminal and second evaluating means coupled to the intermediate contact of sad potentiometer means for determining the amplitude of the load and for displacing said intermediate contact in accordance with its determinations and third means for supplying to said evaluating means a signal indicating the deviation of the pilot value of the peak load from the readout reference value therefor.

4. Apparatus as claimed in claim 1, wherein said program data also includes time constant data and said sensing means varies the time constant of said integrator means in accordance with said data.

5. Apparatus as claimed in claim 1, wherein said reference means further comprises potentiometer means connected in the input of said integrator means, and wherein said program data also includes time constant data and said sensing means is coupled to said potentiometer means for varying said potentiometer means in accordance with said data.

6. Apparatus for regulating a predetermined load operation by providing and maintaining a predetermined increase and predetermined peak values of a load in accordance with a difference between a pilot value corresponding to the load and a reference value corresponding to a desired load, said apparatus including
load means for applying a load to an object;
difference amplifier means having two inputs and an output electrically connected to said load means for controlling said load means;
pilot means for applying a voltage corresponding to said pilot value to one input of said difference amplifier means; and
reference means for applying a voltage corresponding to said reference value to the other input of said difference amplifier means, said reference means comprising means for varying said reference value in accordance with a time constant, said reference means comprising sensing means for reading out program data including a desired reference value and comparing means having inputs coupled to said pilot means and to said sensing means and an output coupled to said sensing means and switching means for continued switching of said sensing means when said reference value and said pilot value coincide.

7. Apparatus as claimed in claim 6, wherein said program data also includes a digital peak value and said comparing means of said reference means continues switching of said sensing means when said pilot value and said peak value coincide.

8. Apparatus as claimed in claim 6, wherein said program data also includes time constant data and wherein said reference means further comprises integrator means having a variable time constant and switching means coupled between the output of said comparing means and said integrator means for switching in condition when the voltage applied thereto reaches zero and for varying the input voltage of said integrator means in accordance with the value of the time constant.

9. Apparatus as claimed in claim 8, wherein said reference means further comprises a potentiometer connected between said switching means and said integrator means, said potentiometer varying the voltage applied to said integrator means.

10. Apparatus as claimed in claim 6, wherein the comparing means of said reference means comprises difference amplifier means.

11. Apparatus as claimed in claim 6, wherein the comparing means of said reference means comprises a single difference amplifier.

12. Apparatus as claimed in claim 11, wherein said reference means further comprises switching means connected between the output of said difference amplifiers and said sensing means for switching in condition when the voltage applied thereto reaches zero.

13. Apparatus as claimed in claim 6, wherein the comparing means of said reference means comprises a pair of difference amplifiers and a pair of potentiometers each connected in an input of a corresponding one of said difference amplifiers and said difference amplifiers provide a pulse for continued switching of said sensing means, said pulse having a repetition rate determined by said potentiometers in accordance with said pilot value and an adjusted reference value.

14. Apparatus for regulating a predetermined load operation in accordance with a stored program, comprising
load means for applying a load to an object;
sensing means having an input for reading out program data including a stored peak desired reference value and a stored time constant for an increase in load;
measuring means coupled to the load means for measuring the pilot value of the load means;
reference means for providing a reference value corresponding to a desired load;
a first difference amplifier having one input connected to said measuring means and another input connected to said reference means, said reference means comprising a potentiometer adjusted to the reference value of the peak value of the load, a second difference amplifier having an output, one input connected to said measuring means and another input connected to the potentiometer, adjusting means for changing the time constant, a flip-flop having an input connected to the output of said second difference amplifier and an output connected to the input of the sensing means, said sensing means having one output connected to the input of said potentiometer and another output connected to said adjusting means, and an integrator having an input coupled to the output of said flip-flop and an output connected to the other input of said first difference amplifier.

15. Apparatus as claimed in claim 14, wherein said reference means comprises sensing means for reading out program data including a desired reference value, compensating means having input and output means coupled to said sensing means for comparing said pilot value with said reference value and switching means for continued switching of said sensing device when said pilot and reference values coincide.